Figure 1:
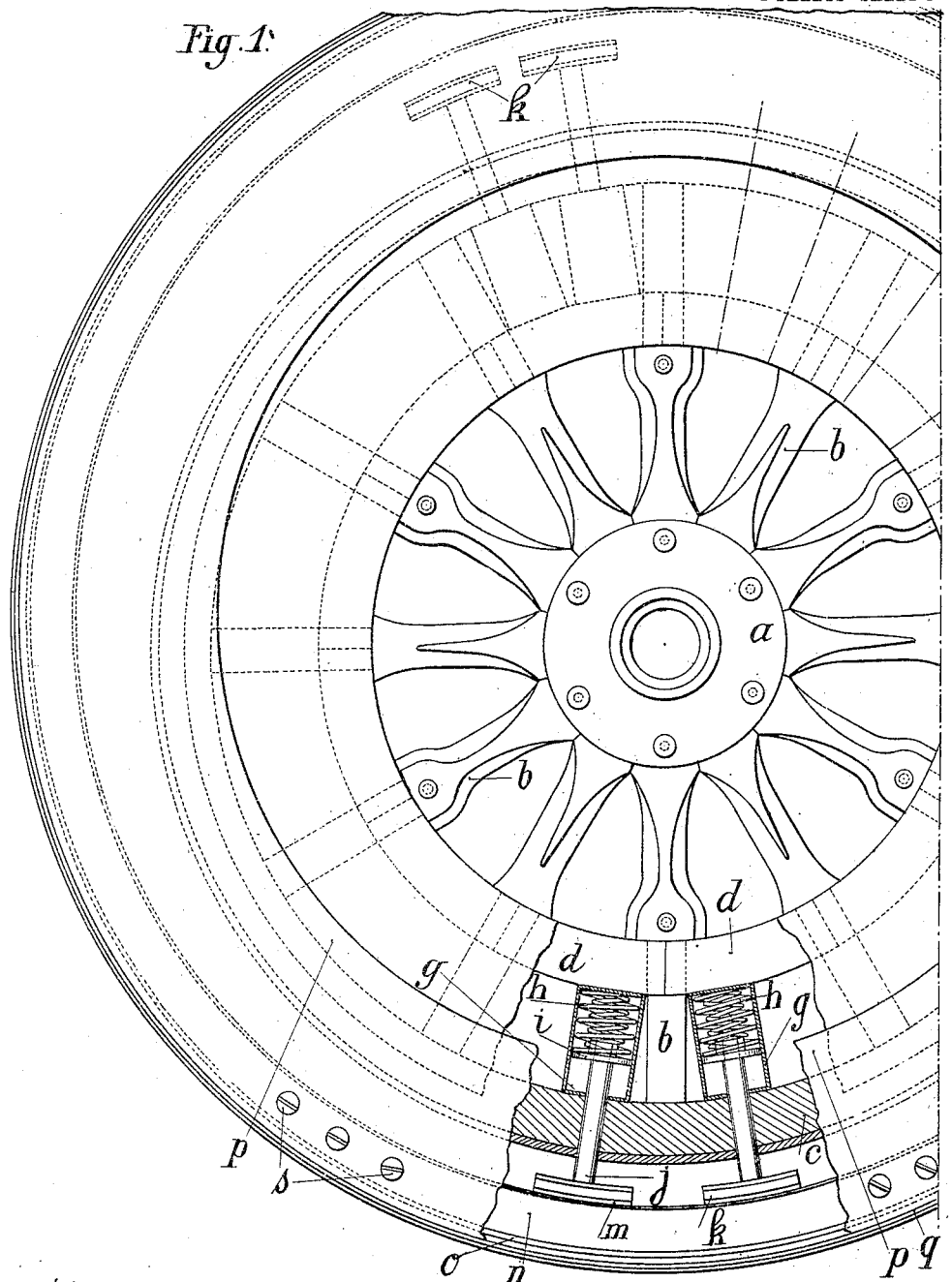

No. 829,037. PATENTED AUG. 21, 1906.
G. SCRÉPEL & E. J. L. BROUX.
WHEEL.
APPLICATION FILED NOV. 11, 1905.

2 SHEETS—SHEET 1.

Witnesses
Inventors
Georges Scrépel,
Étic Jules Léon Broux
by
Attorney

No. 829,037. PATENTED AUG. 21, 1906.
G. SCRÉPEL & E. J. L. BROUX.
WHEEL.
APPLICATION FILED NOV. 11, 1905.
2 SHEETS—SHEET 2.
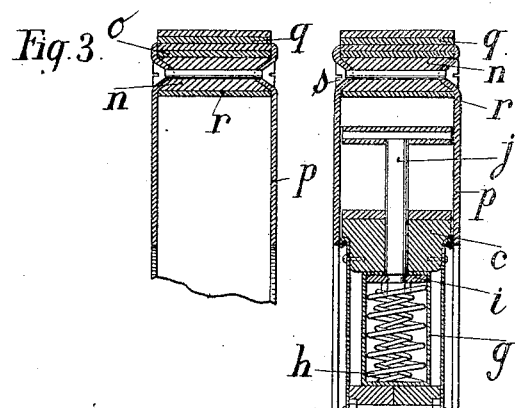
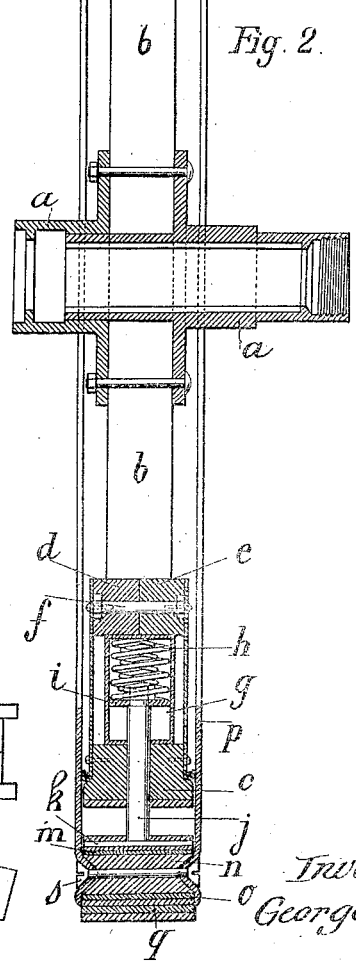
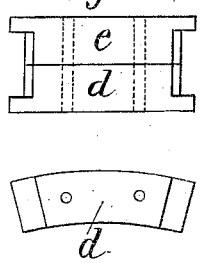

UNITED STATES PATENT OFFICE.

GEORGES SCRÉPEL AND ELIÉ JULES LEON BROUX, OF ROUBAIX, FRANCE.

WHEEL.

No. 829,037. Specification of Letters Patent. Patented Aug. 21, 1906.

Application filed November 11, 1905. Serial No. 286,784.

*To all whom it may concern:*

Be it known that we, GEORGES SCRÉPEL, residing at 4bis Rue Vauban, and ELIÉ JULES LEON BROUX, residing at 19 Rue de Beaumont, Roubaix, Nord, France, citizens of France, have invented new and useful Improvements in Wheels for Automobiles or other Vehicles, of which the following is a specification.

This invention has for its object to provide a wheel for automobiles or other vehicles which without carrying a pneumatic tire and without presenting in consequence the inconveniences of a pneumatic tire shall yet considerably diminish shocks and concussions due to unevenness of the road.

An essential characteristic of a wheel constructed according to this invention is the arrangement of the wheel proper in a free felly formed by a sort of annular box of U-section in which the wheel can play freely in its plane without the free felly and wheel proper becoming disconnected, the connection between the wheel proper and the bottom of the box being constantly and elastically assured from the rolling side by a series of spring-pistons guided in the wheel proper.

One construction of wheel according to this invention is represented in the accompanying drawings.

Figure 1 thereof shows the wheel in elevation with a part broken away. Fig. 2 shows the wheel in central vertical transverse section. Fig. 3 is a partial transverse section of the free felly of the wheel; and Figs. 4 and 5 show in elevation and in under side plan, respectively, one of the elements of the wheel proper.

The parts indicated by the references $a$, $b$, $c$, $d$, $e$, $f$, $g$, $h$, $i$, $j$, $k$, and $m$, hereinafter particularly referred to, constitute the wheel proper, while the free felly of the wheel with lateral cheeks $p$ is indicated by the references $n$, $o$, $p$, $q$, $r$, and $s$.

The wheel proper comprises a hub or nave $a$, to which are fixed spokes $b$, the outer ends of which are connected together by a fixed felly $c$ and segments $d$ $e$, each made in two pieces, Figs. 4 and 5, which when in place and secured by bolts $f$ form a fixed intermediate ring between the boss or nave $a$ and the fixed felly $c$. The ring $d$ $e$ forms a support for the inner ends of a series of cylinders $g$, the outer ends of which bear upon the fixed felly $c$. Any desired number of these cylinders are arranged in the spaces between the spokes $b$. In the example illustrated there are arranged two such cylinders between each pair of spokes. Each cylinder contains one or more springs $h$, that constantly tend to push outwardly the inner head $i$ of a piston $i$ $j$ $k$ $m$, the rod portion $j$ of which traverses the fixed felly $c$ and carries at its outer end a head $k$, covered with a supple material $m$, the curvature of which corresponds to the curvature of the interior face $r$ of the free felly $n$ $o$ $p$ $q$ $r$.

The free felly comprises a rigid ring $n$, of, for example, wood and iron, the outer periphery of which may be provided with a supple tire $q$, of leather, caoutchouc, or the like, and the inner periphery of which is preferably furnished with a cushioning-tire $r$. Laterally this free felly is provided with two cheeks $p$, conveniently fixed to the rigid ring $n$, for example, by bolts $s$.

It will be readily seen that the wheel proper will be always eccentric in relation to the free felly which encircles it. The tension of the springs $h$ is so adjusted that in the majority of the cylinders of the lower half of the wheel they are always compressed, the outer heads $k$ of the pistons of the upper cylinders, where the springs are not compressed, then extending to their greatest extent toward the inner periphery of the free felly, as shown in Fig. 1.

It is to be understood that the arrangement described may be somewhat modified in its details without thereby departing from the scope of the invention. The coiled springs $h$, for example, may be replaced by any other cushioning or elastic device—such, for example, as a compressed fluid.

What we claim is—

1. In a vehicle-wheel, an inner wheel, a free felly encircling said inner wheel, radially-sliding pistons guided by said inner wheel, cylinders carried by said inner wheel within which said pistons slide, heads on the outer ends of said pistons adapted to bear on the inner periphery of said free felly consecutively when the wheel is in use, means adapted to force said pistons outwardly, means to limit the extent of outward movement of said pistons, and annular side cheeks fixed to said free felly embracing said inner wheel to limit relative lateral movement of said free felly and inner wheel, substantially as set forth.

2. In a vehicle-wheel, an inner wheel, a free felly encircling said inner wheel, radially-arranged cylinders carried by said inner wheel, pistons sliding in said cylinders, means adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel substantially as set forth.

3. In a vehicle-wheel, an inner wheel, a free felly encircling said inner wheel, radially-arranged cylinders carried by said inner wheel, pistons sliding in said cylinders, springs within said cylinders adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

4. In a vehicle-wheel, an inner wheel comprising a hub portion and a rim portion formed with radially-arranged holes, a free felly encircling said inner wheel, radially-sliding pistons extending through the holes of the rim portion of said inner wheel, cylinders carried by said inner wheel within which said pistons slide, heads on the outer ends of said pistons adapted to bear on the inner periphery of said free felly consecutively when the wheel is in use, means adapted to force said pistons outwardly, means to limit the extent of outward movement of said pistons, and annular side cheeks fixed to said free felly embracing said inner wheel to limit relative lateral movement of said free felly and inner wheel, substantially as set forth.

5. In a vehicle-wheel, an inner wheel comprising a hub portion and a rim portion formed with radially-arranged holes, a ring fixed to said inner rim between said hub and rim portions, a free felly encircling said inner wheel, radially-sliding pistons, extending through the holes of the rim portion of said inner wheel, radially-arranged cylinders between said fixed ring and the rim portion of said inner wheel in which the inner portions of said pistons work, means within said cylinders adapted to force said pistons outwardly, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

6. In a vehicle-wheel, an inner wheel comprising a hub portion and a rim portion formed with radially-arranged holes, a ring fixed to said inner rim between said hub and rim portions, a free felly encircling said inner wheel, radially-sliding pistons extending through the holes of the rim portion of said inner wheel, radially-arranged cylinders between said fixed ring and the rim portion of said inner wheel in which the inner portions of said pistons work, means within said cylinders adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

7. In a vehicle-wheel, an inner wheel comprising a hub portion and a rim portion formed with radially-arranged holes, a ring fixed to said inner rim between said hub and rim portions, a free felly encircling said inner wheel, radially-sliding pistons extending through the holes of the rim portion of said inner wheel, radially-arranged cylinders between said fixed ring and the rim portion of said inner wheel in which the inner portions of said pistons work, springs within said cylinders adapted to force said pistons outwardly, heads on the outer ends of said pistons adapted to bear on the inner periphery of said free felly consecutively when the wheel is in use and annular side cheeks fixed to said free felly embracing said inner wheel to limit relative lateral movement of said free felly and inner wheel, substantially as set forth.

8. In a vehicle-wheel, an inner wheel comprising a hub portion and a rim portion formed with radially-arranged holes, a ring fixed to said inner rim between said hub and rim portions, a free felly encircling said inner wheel, radially-sliding pistons extending through the holes of the rim portion of said inner wheel, radially-arranged cylinders between said fixed ring and the rim portion of said inner wheel in which the inner portions of said pistons work, springs within said cylinders adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

9. In a vehicle-wheel, an inner wheel comprising a hub portion and a rim portion formed with radially-arranged holes, a ring fixed to said inner rim between said hub and rim portions, a free felly encircling said inner wheel, a tire on the outer periphery of said free felly, a cushioning-tire on the inner periphery of said free felly, radially-sliding pistons extending through the holes of the rim portion of said inner wheel, radially-arranged cylinders between said fixed ring and the rim portion of said inner wheel in which the inner portions of said pistons work, springs within said cylinders adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

10. In a vehicle-wheel, an inner wheel comprising a hub portion and a rim portion formed with radially-arranged holes, a ring fixed to said inner rim between said hub and rim portions, a free felly encircling said inner wheel, a tire on the outer periphery of said free felly, a cushioning-tire on the inner periphery of said free felly, radially-sliding pistons extending through the holes of the rim portion of said inner wheel, radially-arranged cylinders between said fixed ring and the rim portion of said inner wheel in which the inner portions of said pistons work, springs within said cylinders adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, supple material covering said outer heads, and annular side cheeks fixed to said free felly embracing said inner wheel to limit relative lateral movement of said free felly and inner wheel, substantially as set forth.

11. In a vehicle-wheel, an inner wheel comprising a hub portion and a rim portion formed with radially-arranged holes, a ring fixed to said inner rim between said hub and rim portions, built up of segments each comprising two parts held together by bolts, a free felly encircling said inner wheel, radially-sliding pistons extending through the holes of the rim portion of said inner wheel, radially-arranged cylinders between said fixed ring and the rim portion of said inner wheel in which the inner portions of said pistons work, means within said cylinders adapted to force said pistons outwardly, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

12. In a vehicle-wheel, an inner wheel comprising a hub portion and a rim portion formed with radially-arranged holes, a ring fixed to said inner rim between said hub and rim portions, built up of segments each comprising two parts held together by bolts, a free felly encircling said inner wheel, radially-sliding pistons extending through the holes of the rim portion of said inner wheel, radially-arranged cylinders between said fixed ring and the rim portion of said inner wheel in which the inner portions of said pistons work, springs within said cylinders adapted to force said pistons outwardly, heads on the inner ends of said pistons adapted by bearing on the inner sides of the outer ends of said cylinders to limit the extent of outward movement of said pistons, heads on the outer ends of said pistons adapted to bear on the inner periphery of said free felly consecutively when the wheel is in use, and annular side cheeks fixed to said free felly embracing said inner wheel to limit relative lateral movement of said free felly and inner wheel, substantially as set forth.

In testimony whereof we have signed our names to this specification in the presence of two subscribing witnesses.

GEORGES SCRÉPEL.
ÉLIE JULES LEON BROUX.

Witnesses:
ALFRED C. HARRISON,
NOËL DHUERT.